United States Patent
Sangaru et al.

(10) Patent No.: US 10,227,522 B2
(45) Date of Patent: Mar. 12, 2019

(54) FLUID EFFICIENCY FOR VISCOELASTIC SURFACTANT BASED FLUIDS WITH NANOPARTICLES

(71) Applicants: Shiv Shankar Sangaru, Al-Khobar (SA); Prahlad Yadav, Jabalpur (IN); Tianping Huang, Spring, TX (US); Gaurav Agrawal, Dammam (SA); Mohammed Al-Rabah, Qataif (SA)

(72) Inventors: Shiv Shankar Sangaru, Al-Khobar (SA); Prahlad Yadav, Jabalpur (IN); Tianping Huang, Spring, TX (US); Gaurav Agrawal, Dammam (SA); Mohammed Al-Rabah, Qataif (SA)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

(21) Appl. No.: 15/163,722

(22) Filed: May 25, 2016

(65) Prior Publication Data
US 2017/0342308 A1 Nov. 30, 2017

(51) Int. Cl.
*E21B 43/16* (2006.01)
*C09K 8/506* (2006.01)
(Continued)

(52) U.S. Cl.
CPC ............ *C09K 8/506* (2013.01); *C09K 8/5045* (2013.01); *C09K 8/602* (2013.01); *C09K 8/665* (2013.01);
(Continued)

(58) Field of Classification Search
CPC ...... C09K 8/506; C09K 8/5045; C09K 8/602; C09K 2208/10; C09K 2208/30; C09L 8/68; E21B 43/26; E21B 43/16
(Continued)

(56) References Cited

U.S. PATENT DOCUMENTS 7,081,439 B2 7/2006 Sullivan et al.
7,279,446 B2 10/2007 Colaco et al.
(Continued)

OTHER PUBLICATIONS

Ayoub, et al. "New Findings in Fracture Cleanup Change Common Industry Perceptions", Paper SPE 98746 presented at the 2006 SPE International Symposium and Exhibition on Formation Damage Control held in Lafayette, LA, Feb. 15-17, 2006; 7 pages.
(Continued)

*Primary Examiner* — Silvana C Runyan
(74) *Attorney, Agent, or Firm* — Cantor Colburn LLP (57) ABSTRACT

A method of treating a subterranean formation penetrated by a well comprises combining an aqueous base fluid, a viscoelastic surfactant gelling agent, two or more types of the following nanoparticles: an alkaline earth metal oxide; an alkaline earth metal hydroxide; a transition metal oxide; or a transition metal hydroxide to form a treatment fluid, and pumping the treatment fluid into the well, wherein the weight ratio of the two or more types of the nanoparticles is selected such that the treatment fluid has an improved fluid efficiency as compared to an otherwise identical reference fluid except for comprising only one type of the nanoparticles selected from an alkaline earth metal oxide; an alkaline earth metal hydroxide; a transition metal oxide; and a transition metal hydroxide.

18 Claims, 6 Drawing Sheets

(51) Int. Cl.
    *C09K 8/504* (2006.01)
    *C09K 8/60* (2006.01)
    *C09K 8/68* (2006.01)
    *E21B 43/26* (2006.01)
    *C09K 8/66* (2006.01)

(52) U.S. Cl.
    CPC ............... *C09K 8/68* (2013.01); *E21B 43/16* (2013.01); *E21B 43/26* (2013.01); *C09K 2208/10* (2013.01); *C09K 2208/30* (2013.01)

(58) Field of Classification Search
    USPC ...................................................... 166/305.1
    See application file for complete search history.

(56) References Cited

U.S. PATENT DOCUMENTS

| | | | |
|---|---|---|---|
| 7,544,643 B2 | 6/2009 | Huang | |
| 7,696,134 B2 | 4/2010 | Crews et al. | |
| 7,703,531 B2 | 4/2010 | Huang et al. | |
| 7,967,068 B2 | 6/2011 | Huang et al. | |
| 8,114,820 B2* | 2/2012 | Crews | C09K 8/5045 507/240 |
| 8,188,015 B2 | 5/2012 | Crews et al. | |
| 8,236,864 B2 | 8/2012 | Crews | |
| 8,445,414 B2 | 5/2013 | Crews et al. | |
| 8,778,852 B2 | 7/2014 | Huang | |
| 2008/0051302 A1* | 2/2008 | Crews | C09K 8/602 507/271 |
| 2008/0060812 A1* | 3/2008 | Huang | C09K 8/665 166/308.2 |
| 2008/0153720 A1 | 6/2008 | Huang et al. | |
| 2012/0015852 A1 | 1/2012 | Quintero et al. | |
| 2012/0032543 A1* | 2/2012 | Chakraborty | B82Y 30/00 310/90 |
| 2013/0090270 A1* | 4/2013 | Crews | C09K 8/68 507/240 |
| 2013/0190215 A1 | 7/2013 | Huang | |
| 2013/0341022 A1 | 12/2013 | Nguyen et al. | |
| 2014/0076572 A1* | 3/2014 | Gadberry | C09K 8/602 166/308.4 |

OTHER PUBLICATIONS

Haruta, M. "Nanoparticulate Gold Catalysts for Low-Temperature CO Oxidation", Journal of New Materials for Electrochemical Systems 7, 163-172 (2004).
Helgeson, et al. "Formation and Rheology of Viscoelastic "Double Networks" in Wormlike Micelle-Nanoparticle Mixtures", Langmuir 2010, 26(11); pp. 8049-8060.
Huang, et al. "Nanotechnology Applications in Viscoelastic Surfactant Stimulation Fluids", SPE Production and Operations, Baker Hughes, Nov. 2008; 6 pages.
Mair, et al. "Observation of shear banding in worm-like micelles by NMR velocity imaging", Europhys. Lett., 36 (9), 1996; 7 pages.
Miller, et al. "Transient evolution of shear-banding wormlike micellar solutions", J. Non-Newtonian Fluid Mech. 143 (2007); pp. 22-37.
Nettesheim, et al. "Influence of Nanoparticle Addition on the Properties of Wormlike Micellar Solutions", Langmuir, 2008, 24; pp. 7718-7726.
Samuel, et al. "Polymer-Free Fluid for Fracturing Applications", SPE Drilling & Completion 14 (4), Dec. 1999; 7 pages.
Yang, Jiang "Viscoelastic wormlike micelles and their applications", Current Opinion in Colloid & Interface Science 7, 2002; pp. 276-281.
International Search Report, International Application No. PCT/US2017/031532, dated Aug. 17, 2017, Korean Intellectual Property Office; International Search Report 5 pages.
International Written Opinion, International Application No. PCT/US2017/031532, dated Aug. 17, 2017, Korean Intellectual Property Office; International Written Opinion 8 pages.

* cited by examiner

FLUID EFFICIENCY FOR VISCOELASTIC SURFACTANT BASED FLUIDS WITH NANOPARTICLES

BACKGROUND

Viscoelastic surfactant (VES) based fluids have been widely used as gravel-packing, frac-packing and fracturing fluids for more than a decade because the fluids exhibit excellent rheological properties and maintain low formation damage characteristics. However, unlike crosslinked polymer fluids, VES fluids do not form filter-cake on formation face during fracturing and frac-pack treatments, thus VES fluids can exhibit very high fluid leak-off from the fracture during a treatment and the fluid efficiency can be much lower than that of the crosslinked polymer fluids.

Various fluid loss control agents have been disclosed in the art. Despite all the advances, there remains a need in the art for additional materials having improved fluid loss control efficiencies. It would be a further advantage if the improved fluid efficiency could be achieved without a significant detrimental effect on other desirable properties of the VES fluids.

BRIEF DESCRIPTION

A method of treating a subterranean formation penetrated by a well comprises combining an aqueous base fluid, a viscoelastic surfactant gelling agent, two or more types of the following nanoparticles: an alkaline earth metal oxide; an alkaline earth metal hydroxide; a transition metal oxide; or a transition metal hydroxide to form a treatment fluid, and pumping the treatment fluid into the well, wherein the weight ratio of the two or more types of the nanoparticles is selected such that the treatment fluid has an improved fluid efficiency as compared to an otherwise identical reference fluid except for comprising only one type of nanoparticles selected from an alkaline earth metal oxide; an alkaline earth metal hydroxide; a transition metal oxide; and a transition metal hydroxide.

A method of reducing fluid leak-off in a treatment fluid comprises adding magnesium oxide nanoparticles and zinc oxide nanoparticles having a weight ratio of about 6:1 to about 1:6 to a treatment fluid comprising an aqueous base fluid and a viscoelastic surfactant gelling agent.

A treatment fluid comprises an aqueous base fluid; a viscoelastic surfactant gelling agent; and two or more types of the following nanoparticles: an alkaline earth metal oxide; an alkaline earth metal hydroxide; a transition metal oxide; or a transition metal hydroxide, wherein the weight ratio of the two or more types of the nanoparticles is selected such that the treatment fluid has an improved fluid efficiency as compared to an otherwise identical reference fluid except for comprising only one type of the nanoparticles selected from an alkaline earth metal oxide; an alkaline earth metal hydroxide; a transition metal oxide; and a transition metal hydroxide.

BRIEF DESCRIPTION OF THE DRAWINGS

The following descriptions should not be considered limiting in any way. With reference to the accompanying drawings, like elements are numbered alike.

DETAILED DESCRIPTION

The inventors hereof have discovered that a significant improvement in the fluid efficiency can be achieved by using a combination of nanoparticles in a viscoelastic fluid. In particular, the inventors have found that a combination of two or more different types of nanoparticles such as transition metal oxides and alkaline earth metal oxides can synergistically reinforce each other's role in improving the viscoelastic fluid gel structure. Accordingly as opposed to using a single type of nanoparticles, a combination of different types of nanoparticles leads to a much better fluid leak-off control, which is not achievable when only one type of nanoparticles is used at the same quantity.

Without wishing to be bound by theory, it is believed that the synergistic improvement on fluid loss could be attributed to the difference in the isoelectric points of the two or more different types of nanoparticles. The nanoparticles with varying degree of surface charges are possibly acting as large multivalent counter ions providing the wormlike micelles formed by the viscoelastic surfactant a more rigid structure thereby improving the fluid efficiency.

The discovery allows the manufacture of viscoelastic surfactant based treatment fluids (also referred to as "treatment fluids" herein) having a fluid loss profile close to polymer based treatment fluids without the disadvantages of formation damages.

Additionally, viscoelastic surfactant based fluids are composed of surfactant molecules with certain ratio of hydrophobic and hydrophilic part, which have a tendency to form elongated worm-like micellar structures within aqueous medium. Entanglement of these worm-like micellar structures creates a gel like structure in the fluid. As these gels are formed through intermolecular weak interactions and self-assembly, their fluid properties are more susceptible to the presence of most fluid additives. Therefore, it is very desirable that while using an additive to improve certain functionality, other fluid properties are not adversely affected if not improved.

It has been found that a combination of different type nanoparticles does not impair the viscosity of the viscoelastic fluids. In addition, the viscoelastic surfactant fluids comprising two different types of nanoparticles have stable viscosity at a high temperature such as 300° F.

Further, the viscoelastic surfactant fluids comprising a combination of different types of nanoparticles do not form any scales thus avoiding formation damages associated with the generation of scales.

The viscoelastic surfactant fluids disclosed herein are also very tolerant to high salinity brines. Hence it is feasible to use seawater and produced water for the viscoelastic fluid formulations.

The viscoelastic surfactants useful herein include, but are not necessarily limited to, non-ionic, cationic, amphoteric, and zwitterionic surfactants. These surfactants can be used either alone or in combination with other surfactants to create ordered structures, which result in increased viscosity of aqueous-based fluids. Specific examples of zwitterionic/amphoteric surfactants include, but are not necessarily limited to, dihydroxyl alkyl glycinate, alkyl ampho acetate or propionate, alkyl betaine, alkyl amidopropyl betaine and alkylimino mono- or di-propionates derived from certain waxes, fats and oils. Quatemary amine surfactants are typically cationic, and the betaines are typically zwitterionic. When the surfactant is cationic, it is associated with a negative counterion, which can be an inorganic anion such as a sulfate, a nitrate, a perchlorate or a halide such as Cl, Br or with an aromatic organic anion such as salicylate, naphthalene sulfonate, p and m chlorobenzoates, 3,5 and 3,4 and 2,4-dichlorobenzoates, t-butyl and ethyl phenate, 2,6 and 2,5-dichlorophenates, 2,4,5-trichlorophenate, 2,3,5,6-tetrachlorophenate, p-methyl phenate, m-chlorophenate, 3,5,6-trichloropicolinate, 4-amino-3,5,6-trichlorpicolinate, 2,4-dichlorophenoxyacetate. When the surfactant is anionic, it is associated with a positive counterion, for example, $Na^+$ or $K^+$. When it is zwittemionic, it is associated with both negative and positive counterions, for example, Cl and $Na^+$ or $K^+$. Other viscoelastic surfactant has been described in U.S. Pat. Nos. 7,081,439 and 7,279,446. In an embodiment, the viscoelastic surfactant includes those described in 20140076572, and can be erucamidopropyl hydroxypropyl sulfobetaine, erucamidopropyl hydroxyethyl sulfobetaine, erucamidopropyl hydroxymethyl sulfobetaine, or a combination comprising at least one of the foregoing. Erucamidopropyl hydroxypropyl sulfobetaine, also known as erucamido hydroxysultaine, is specifically mentioned. The viscoelastic surfactants may be used in conjunction with organic additive such as phthalic acid, salicylic acid or their salts.

The viscoelastic surfactant is present in an amount of about 1 wt. % to about 20 wt. % or about 5 wt. % to about 15 wt. %, based on the total weight of the treatment fluid.

The aqueous base fluid includes water or brine. The brine is, for example, seawater, produced water, completion brine, or a combination thereof. The properties of the brine can depend on the identity and components of the brine. Seawater, as an example, contains numerous constituents such as sulfate, bromine, and trace metals, beyond typical halide-containing salts. In some embodiments, produced water is water extracted from a production reservoir (e.g., hydrocarbon reservoir) or produced from the ground. Produced water also is referred to as reservoir brine and contains components such as barium, strontium, and heavy metals. In addition to the naturally occurring brines (seawater and produced water), completion brine is synthesized from fresh water by addition of various salts such as KCl, NaCl, $ZnCl_2$, $MgCl_2$, or $CaCl_2$ to increase the density of the brine, such as 10.6 pounds per gallon of $CaCl_2$ brine. If desired, the above brines can be further modified to include an additional salt. In an embodiment, the additional salt included in the brine is KBr, NaBr, $CaBr_2$, $ZnBr_2$, $NH_4Cl$, potassium formate, sodium formate, cesium formate, and the like. A calcium salt such as calcium chloride is specifically mentioned. In an example, the salt for example a calcium salt is present in the brine in an amount from about 5 weight percent (wt %) to about 50 wt %, or about 10 weight percent to about 50 wt %, specifically about 15 wt % to about 40 wt %, and more specifically about 25 wt % to about 35 wt %, based on the total weight of the brine.

Water soluble solvents can also be included in the aqueous base fluid. Exemplary water soluble solvents include but are not limited to methanol, ethanol, propanol, butanol, ethylene glycol, propylene glycol, polyethylene glycol, polypropylene glycol, isomers thereof, or a combination comprising at least one of the foregoing.

The two or more types of the nanoparticles are selected from an alkaline earth metal oxide; an alkaline earth metal hydroxide; a transition metal oxide; or a transition metal hydroxide. The transition metal is vanadium, molybdenum, manganese, iron, cobalt, nickel, palladium, copper, or zinc, titanium. The alkaline earth metal comprises magnesium, calcium, strontium, barium and combinations thereof. In an embodiment, the two or more types of the nanoparticles comprise (1) at least an alkaline earth metal oxide nanoparticle or an alkaline earth metal hydroxide; and (2) at least a transition metal oxide or a transition metal hydroxide. In another embodiment, the two or more types of the nanoparticles comprise an alkaline earth metal oxide nanoparticle and a transitional metal oxide nanoparticle. In a specific embodiment, the alkaline earth metal oxide is magnesium oxide and the transitional metal oxide is zinc oxide.

The sum of the weight of the two or more types of the nanoparticles is about 2 parts by weight to about 50 parts by weight per one thousand gallons (ppt or pptg) of the treatment fluid. In specific embodiments, the sum of the weight of the two or more types of the nanoparticles such as the sum of the weight of the alkaline earth metal oxide nanoparticle and the transition metal oxide nanoparticle is about 10 pptg to about 40 pptg or about 10 pptg to about 30 pptg. The weight ratio of the two different types of the nanoparticles is about 6:1 to about 1:6, about 2.5:1 to about 1:4, about 2:1 to 1:3.5, about 1.5:1 to 1:3, or about 1.5:1 to about 1:2, or about 1.5:1 to about 1:1.5. In an embodiment, the weight ratio of the alkaline earth metal oxide nanoparticle relative to the transition metal oxide nanoparticle is about 6:1 to about 1:6, about 2.5:1 to about 1:4, about 2:1 to 1:3.5, about 1.5:1 to 1:3, or about 1.5:1 to about 1:2, or about 1.5:1 to about 1:1.5.

The two or more types of the nanoparticles each independently has a particle size of less than about 1 micron, less than about 0.5 micron, or less than about 0.1 micron. In an embodiment, the two or more types of the nanoparticles each independently has a particle size of about 10 nanometers to about 500 nanometers, about 20 nanometers to about 100 nanometers or about 20 nanometers to about 40 nanometers. As used herein, "size" refers to the largest linear dimension, e.g., a diameter in a spherical particle.

Using a combination of two or more different types of nanoparticles disclosed herein has a synergistic effect in reducing fluid loss. The treatment fluid can have improved fluid efficiency as compared to an otherwise identical reference fluid except for comprising one type of nanoparticles.

The treatment fluids disclosed herein have a relatively high viscosity at high temperatures. In an embodiment, the treatment fluids have a viscosity of about 50 to about 350 cP or about 250 to about 350 cP at 300° F. and 100 s$^{-1}$.

The treatment fluids disclosed herein also have improved stability at a temperature of greater than about 250° F. In an embodiment, the viscosity of the treatment fluid changes less than 10% after exposing to an environment having a temperature of about 250° F. to about 350° F. for two hours.

The treatment fluids as described herein have use in fracturing fluids, completion fluids, gravel pack fluids, fluid loss pills, lost circulation pills, diverter fluids, foamed fluids, stimulation fluids and the like. The treatment fluid can be a liquid or a foam, where air, nitrogen, carbon dioxide, natural gas and the like is used for the gas phase. A method of treating a subterranean formation penetrated by a well comprises: forming a treatment fluid; and pumping the treatment fluid into the well.

The treat fracturing fluid composition can be made in a variety of ways. According to an embodiment, a process for making the treatment fluid includes combining an aqueous base fluid, a viscoelastic surfactant gelling agent, two or more types of the nanoparticles as disclosed herein. Combining the components of the treatment fluid is accomplished in a vessel such as a mixer, blender, and the like. Alternatively or in addition, the fluid is injected without mixing, e.g. it is injected "on the fly". The components are mixed, agitated, stirred, and the like. In an embodiment, the components are combined as the treatment fluid is being disposed downhole.

The disclosure will be further described with respect to the following Examples which are not meant to be limiting, but rather to further illustrate the various embodiments.

EXAMPLES

Preparation of Ssamples

A VES base fluid (also referred to as "base fluid") was prepared by taking 600 g of calcium chloride and making it up to 2 L with seawater by continuous dissolution. After mixing for 15 min, the solution was centrifuged at 2,500 rpm for 30 min to remove calcium sulfate precipitates formed with the sulfate ions present in the seawater. To 1810 mL of the above solution 190 mL of GBW-300, a VES surfactant from Baker Hughes Incorporated, was added and mixed in a blender for 15 min at 1,000 rpm to provide a base fluid containing 9 wt. % of the VES surfactant and 30 wt. % of $CaCl_2$ in seawater.

Two separate samples of the VES base fluid with 24 pptg of nanoparticles were prepared. First 2.16 g of ZnO (NP-1) and 2.16 g of MgO (NP-2) nanoparticles were separately dispersed in 2 mL of seawater using ultrasonication bath for nearly 15 min. These nanoparticles solutions were then individually mixed with 750 mL of the base VES fluid to form VES fluid A containing the base VES fluid and 24 pptg ZnO (NP-1) and VES fluid B containing the base VES fluid and 24 pptg MgO (NP-2).

VES fluids C-E were prepared by mixing VES fluid A and VES fluid B in various weight ratios. VES fluid C contains the base fluid and 24 pptg of a mixture of ZnO (NP-1) and MgO (NP-2) having a weight ratio of 3:1. VES fluid D contains the base fluid and 24 pptg of a mixture of ZnO (NP-1) and MgO (NP-2) having a weight ratio of 1:1. VES fluid E contains the base fluid and 24 pptg of a mixture of ZnO (NP-1) and MgO (NP-2) having a weight ratio of 1:3.

Testing Procedures

Viscosity measurements were conducted under nitrogen at 500 psi at the indicated temperature.

Fluid leak-off test were carried out using ceramic filter disc of size 2.5"×0.25" with mean pore throat of 10 μm (mercury) and permeability of 775 mD (mercury). Leak-off test was carried out using 400 mL (488 g) of the fluid with 500 psi internal pressure and heated up to 300° F. After 1 hour of heating the leak-off measurements were started by opening the lower valve of the pressure cell and measuring the amount of fluid collected from it with respect to time up to 70 min.

Results

Figure 1:
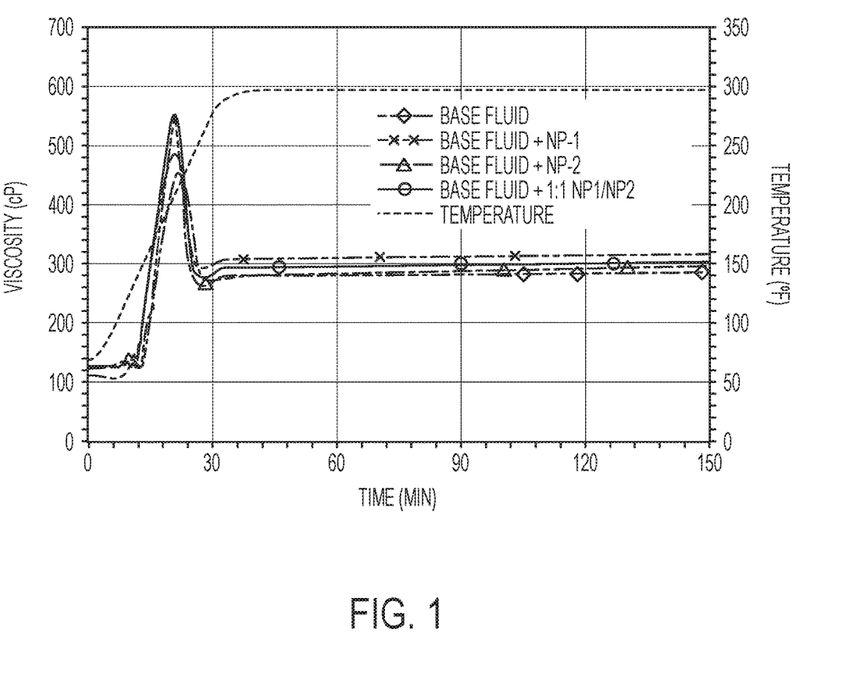
FIG. 1 is a graph illustrating the viscosity of a base VES fluid, and the viscosity measured after adding to the base VES fluid 24 pptg of nanoparticle NP-1 (ZnO nanoparticle) alone, 24 pptg of nanoparticle NP-2 (MgO nanoparticle) alone, or 24 pptg of a combination of 1:1 (weight) NP-1 and NP-2, measured under nitrogen at 300° F. and 500 psi.

FIG. 1 represents a viscosity profile of the VES base fluid and VES fluids A-C. As shown in FIG. 1, the obtained viscosity for the base fluid was 286 cP at 300° F. and a shear rate of 100 s$^{-1}$. The resulting viscosity was stable for more than 2 hours without any degradation. Addition of 24 pptg ZnO nanoparticles (average size 40 nm) to the base fluid led to very minor increase in viscosity to about 316 cP. Similarly, with 24 pptg of MgO (average size 40 nm) viscosity was about 294 cP. The viscosity of fluid C with 24 pptg of 1:1 mixture of ZnO and MgO was about 302 cP. Hence, the observed viscosity was not significantly altered with respect to base fluid after ZnO, MgO, or a combination of ZnO and MgO was added to the base fluid at a shear rate of 100 s$^{-1}$.

Figure 2:
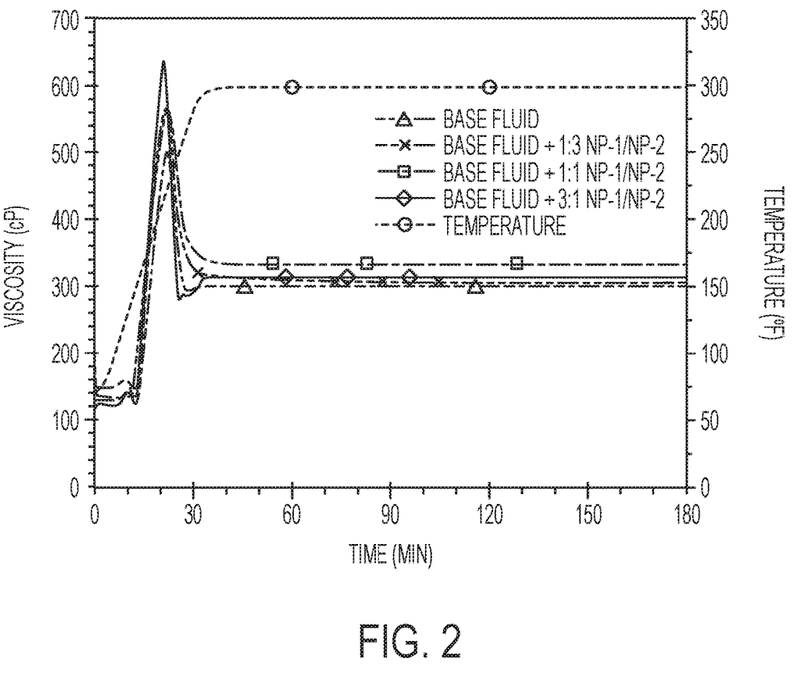
FIG. 2 is a graph illustrating the viscosity of a base VES fluid, and the viscosity measured after adding to the base VES fluid 24 pptg of a combination of NP-1 and nanoparticle NP-2 having a weight ratio of 1:3, 1:1, and 3:1 respectively, measured under nitrogen at 300° F. and 500 psi.

The viscosity of the base fluid without the nanoparticles or with 24 pptg nanoparticles containing ZnO and MgO nanoparticles in the ratio 1:3, 1:1 and 3:1 (samples C-E) was measured to be around 305, 310, 332 and 316 cP, respectively as shown in FIG. 2 at a temperature of 300° F. and a shear rate of 100 s$^{-1}$. No considerable difference in viscosity was observed with incorporation of nanoparticles, though 1:1 mixture of ZnO and MgO showed highest viscosity.

Figure 3:
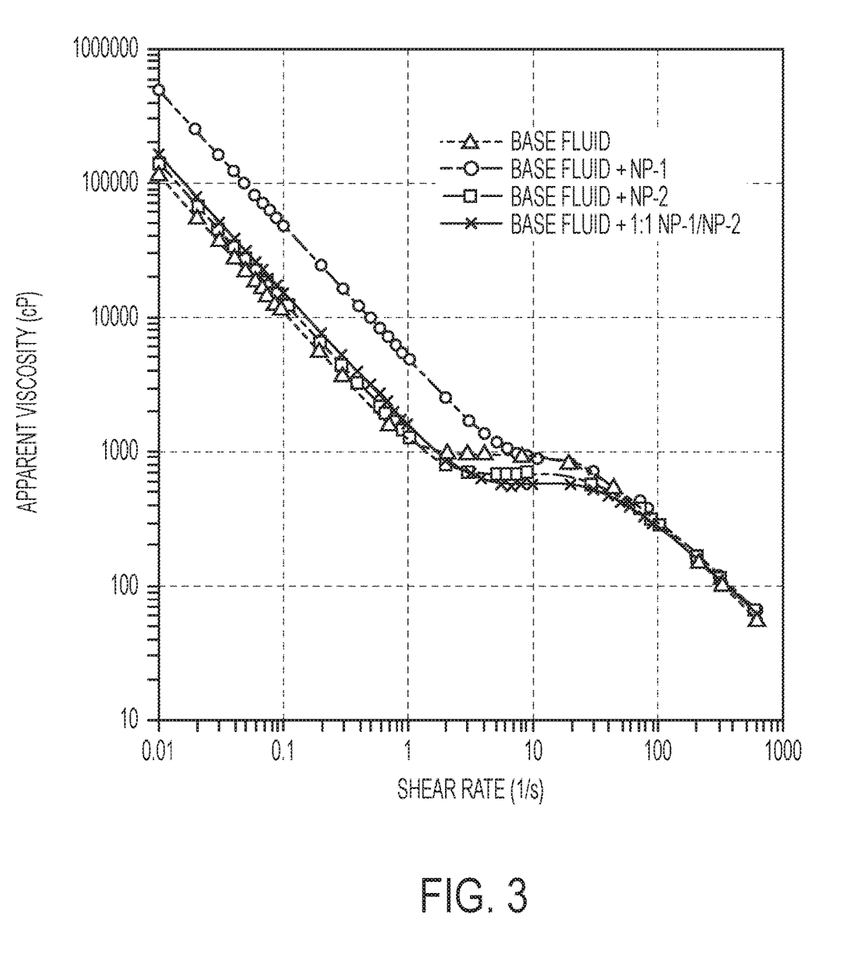
FIG. 3 is a graph illustrating the apparent viscosity versus shear rate of base VES fluids without nanoparticles, and with 24 pptg of nanoparticles NP-1 alone, with 24 pptg of nanoparticles NP-2 alone, or with 24 pptg of a combination of 1:1 (weight) NP-1 and NP-2.
Figure 4:
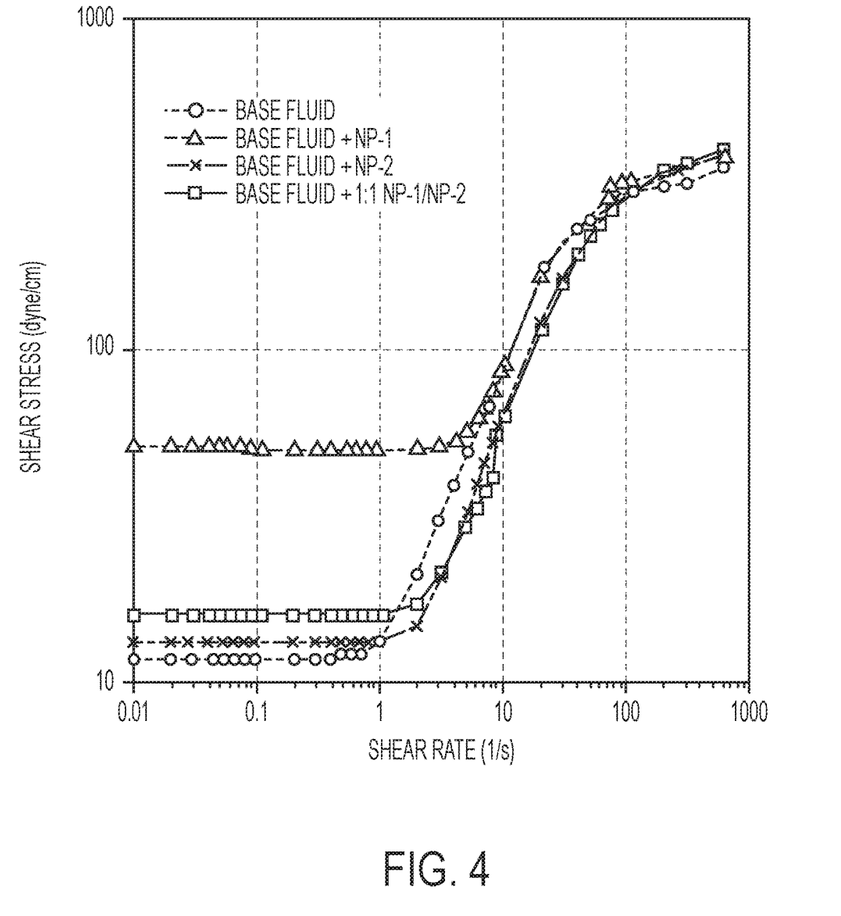
FIG. 4 is a graph illustrating shear stress versus shear rate of base VES fluids without nanoparticles, and with 24 pptg of nanoparticles NP-1 alone, with 24 pptg of nanoparticles NP-2 alone, or with 24 pptg of a combination of 1:1 (weight) NP-1 and NP-2.

FIGS. 3 and 4 show the viscosity and shear stress measured at different shear rate in the range 0.01 s$^{-1}$ to 600 s$^{-1}$. Apparent viscosity with respect to shear rate of the base VES fluid without nanoparticles and with 24 pptg of nanoparticles NP-1 alone, with 24 pptg of nanoparticles NP-2 alone, or with 24 pptg of a combination of 1:1 (weight) NP-1 and NP-2 is shown in FIG. 3. Shear stress with respect to shear rate of the base VES fluid without nanoparticles and with with 24 pptg of nanoparticles NP-1 alone, with 24 pptg of nanoparticles NP-2 alone, or with 24 pptg of a combination of 1:1 (weight) NP-1 and NP-2 is shown in FIG. 4. Noticeable difference could be observed in the viscosity values obtained at lower shear rates. Below shear rate of 1 s$^{-1}$, the apparent viscosity of VES fluid comprising ZnO nanoparticles is much higher than that compared to the base VES fluid without any nanoparticles. The apparent viscosity of base VES fluid without any nanoparticles is 1370 cP at a shear rate of 1 s$^{-1}$, and the corresponding viscosity of VES fluid with 24 pptg ZnO nanoparticles is 5016 cP, which is about 4 times higher than the base fluid. However, the addition of MgO nanoparticles or the addition of both ZnO and MgO nanoparticles in 1:1 weight ratio does not seem to affect the viscosities at low shear rate. For the base VES fluid, the viscosity decreases monotonically as the shear rate increases from 0.01 to 1 s$^{-1}$. As the shear rate increases from 1 to 20 s$^{-1}$, the viscosity remains nearly the same within a narrow range of 900 cP to 1,000 cP. For shear rate greater than 20 s$^{-1}$, the apparent viscosity is observed to monotonically decrease again as shear rate further increases. In FIG. 4 a stress plateau region is observed in the initial low shear rate region. The shear stress value is observed to be the lowest for the base VES fluid and begins to increase above shear rate of 0.4 s$^{-1}$. In comparison, the shear stress plateau in VES fluid with added ZnO nanoparticles is delayed and is observed at slightly higher shear rate value of 3 s$^{-1}$. With MgO nanoparticles as additive and with addition of 1:1 mixture of ZnO and MgO nanoparticles, respectively, the stress plateau region is observed to end at intermediate shear rate value compared to base fluid and fluid with ZnO nanoparticles. The shear stress values are observed to be marginally higher than the base fluid and much less compared to fluid with ZnO nanoparticles.

Figure 5:
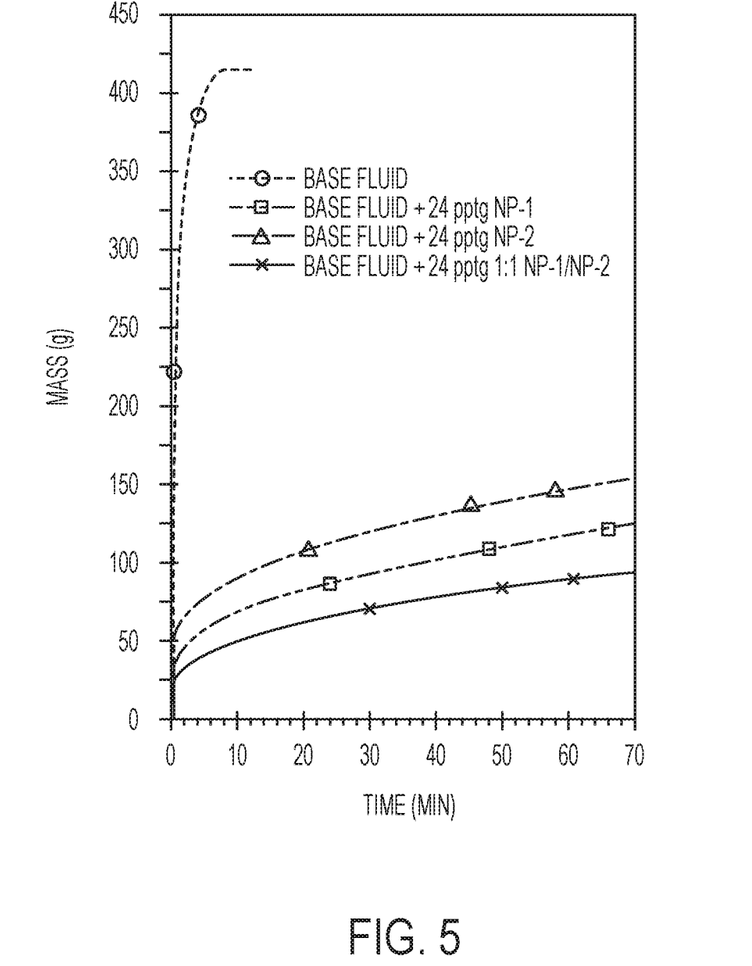
FIG. 5 is graph illustrating fluid leak-off test results of base VES fluid without nanoparticles, and with 24 pptg of nanoparticles NP-1 alone, with 24 pptg of nanoparticles NP-2 alone, or with 24 pptg of a combination of 1:1 (weight) NP-1 and NP-2.

A very significant change was observed in the leak-off properties after addition of nanoparticles as shown in FIG. 5. ZnO and MgO incorporated fluids had leak-off values that were reduced to 123 g and 155 g, respectively. Higher reduction in leak-off value to around 94 g was further observed with fluid containing 1:1 ZnO and MgO nanoparticles. The combination of ZnO and MgO nanoparticles synergistically has a higher impact on the fluid efficiency than that observed when the same amount of ZnO nanoparticles alone or MgO nanoparticles alone are added separately to the same base fluid. It is observed that the fluid with ZnO nanoparticles showing higher low-shear viscosity resulted in lower fluid loss value, whereas fluid with MgO nanoparticles having lower low-shear viscosity had relatively higher fluid loss. It was expected that an intermediate fluid loss value would be obtained by combining nanoparticles ZnO nanoparticles and MgO nanoparticles. However, surprisingly, the fluid with combination of both nanoparticles showed an improved fluid loss value compared to fluid consisting of any one type of nanoparticle. It is evident that when both the nanoparticles are added into the fluid, they demonstrate a synergistic effect to form a more complex pseudo network of the wormlike micellar structure than that is observed with a single type of nanoparticles.

Figure 6:
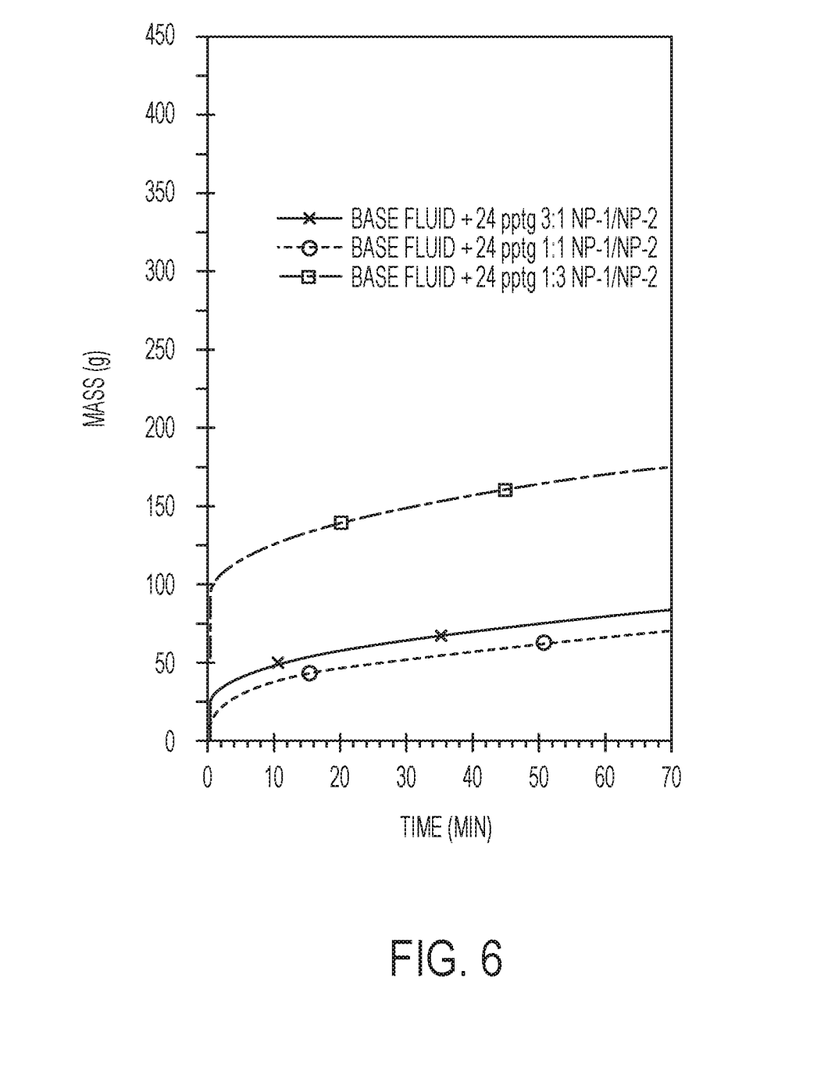
FIG. 6 is a graph illustrating fluid leak-off test results of base YES fluid with 24 pptg of a combination of NP-1 and nanoparticle NP-2 having a weight ratio of 1:3, 1:1, and 3:1 respectively.

Leak-off test were further conducted with different weight ratios of ZnO to MgO in the fluid to determine the optimal ratio required for better fluid efficiency. Tests were carried out with base fluid and fluids C-D. The results are shown in FIG. 6. Leak-off values were around 175 g for ZnO and MgO in the ratio 1:3. With ZnO to MgO ratio of 3:1 the leak-off value was significantly reduced to 82 g. The least leak-off value of 70 g was observed with 1:1 ratio of ZnO to MgO.

All ranges disclosed herein are inclusive of the endpoints, and the endpoints are independently combinable with each other. The suffix "(s)" as used herein is intended to include both the singular and the plural of the term that it modifies, thereby including at least one of that term (e.g., the colorant(s) includes at least one colorants). "Or" means "and/or." "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like. "A combination thereof" means "a combination comprising one or more of the listed items and optionally a like item not listed." All references are incorporated herein by reference.

Embodiment 1. A method of treating a subterranean formation penetrated by a well, the method comprises ⬚ combining an aqueous base fluid, a viscoelastic surfactant gelling agent, two or more types of the following nanoparticles: an alkaline earth metal oxide; an alkaline earth metal hydroxide; a transition metal oxide; or a transition metal hydroxide to form a treatment fluid, and ⬚umping the treatment fluid into the well, wherein the weight ratio of the two or more types of the nanoparticles is selected such that the treatment fluid has an improved fluid efficiency as compared to an otherwise identical reference fluid except for comprising only one type of the nanoparticles selected from an alkaline earth metal oxide; an alkaline earth metal hydroxide; a transition metal oxide; and a transition metal hydroxide.

Embodiment 2. The method of Embodiment 1, wherein the transition metal is vanadium, molybdenum, manganese, iron, cobalt, nickel, palladium, copper, zinc, or titanium.

Embodiment 3. The method of Embodiment 1 or Embodiment 2, wherein the two or more nanoparticles comprise (1) at least an alkaline earth metal oxide or an alkaline earth metal hydroxide; and (2) at least a transition metal oxide or a transition metal hydroxide.

Embodiment 4. The method of any one of Embodiments 1 to 3, wherein the two or more nanoparticles comprises an alkaline earth metal oxide nanoparticle and a transition metal oxide nanoparticle.

Embodiment 5. The method of any one of Embodiments 1 to 4, wherein the aqueous base fluid is a brine comprising about 5 wt. % to about 50 wt. % of a salt.

Embodiment 6. The method of Embodiment 5, wherein the brine is seawater, produced water, completion brine, or a combination thereof.

Embodiment 7. The method of any one of Embodiments 4 to 6, wherein the sum of the weight of the alkaline earth metal oxide nanoparticle and the transition metal oxide nanoparticle is about 2 parts per weight to about 50 parts by weight per one thousand gallons of the treatment fluid.

Embodiment 8. The method of any one of Embodiments 4 to 7, wherein the alkaline earth metal oxide nanoparticle comprises magnesium oxide and the transitional metal oxide nanoparticle comprises zinc oxide.

Embodiment 9. The method of any one of Embodiments 4 to 8, wherein the alkaline earth metal oxide nanoparticle and the transitional metal oxide nanoparticle each independently has a particle size of about 10 nanometers to about 500 nanometers.

Embodiment 10. The method of any one of Embodiments 4 to 9, wherein the weight ratio of the alkaline earth metal oxide nanoparticle relative to the transition metal oxide nanoparticle is about 6:1 to about 1:6.

Embodiment 11. The method of any one of Embodiments 4 to 10, wherein the weight ratio of the alkaline earth metal oxide nanoparticle relative to the transition metal oxide nanoparticle is about 2:1 to about 1:3.

Embodiment 12. The method of any one of Embodiments 1 to 11, wherein the viscoelastic surfactant is present in an amount of about 2 wt. % to about 20 wt. %, based on the total weight of the treatment fluid.

Embodiment 13. A method of reducing fluid leak-off in a treatment fluid, the method comprising adding magnesium oxide nanoparticles and zinc oxide nanoparticles having a weight ratio of about 6:1 to about 1:6 to a treatment fluid comprising an aqueous base fluid and a viscoelastic surfactant gelling agent.

Embodiment 14. The method of Embodiment 13, wherein the aqueous base fluid is a brine comprising about 5 wt. % to about 50 wt. % of a salt.

Embodiment 15. The method of Embodiment 14, wherein the brine is seawater, produced water, completion brine, or a combination thereof.

Embodiment 16. The method of any one of Embodiments 13 to 15, wherein the sum of the weight of the magnesium oxide nanoparticle and the zinc oxide nanoparticles is about 2 parts per weight to about 50 parts by weight per one thousand gallons of the treatment fluid.

Embodiment 17. The method of any one of Embodiments 13 to 16, wherein the viscoelastic surfactant is present in an amount of about 2 wt. % to about 20 wt. %, based on the total weight of the treatment fluid.

Embodiment 18. A treatment fluid comprising an aqueous base fluid; a viscoelastic surfactant gelling agent; and two or more types of the following nanoparticles: an alkaline earth metal oxide; an alkaline earth metal hydroxide; a transition metal oxide; or a transition metal hydroxide, wherein the weight ratio of the two or more types of the nanoparticles is selected such that the treatment fluid has an improved fluid efficiency as compared to an otherwise identical reference fluid except for comprising one type of the nanoparticles selected from an alkaline earth metal oxide; an alkaline earth metal hydroxide; a transition metal oxide; and a transition metal hydroxide.

Embodiment 19. The treatment fluid of Embodiment 18, wherein the aqueous base fluid is a brine comprising about 15 wt. % to about 50 wt. % of a salt.

Embodiment 20. The treatment fluid of Embodiment 18 or Embodiment 19, wherein the sum of the weight of the two or more nanoparticles is about 2 parts per weight to about 50 parts by weight per one thousand gallons of the treatment fluid.

Embodiment 21. The treatment fluid of any one of Embodiments 18 to 20, wherein the two or more types of the nanoparticles comprise an alkaline earth metal oxide nanoparticle and a transition metal oxide nanoparticle.

Embodiment 22. The treatment fluid of Embodiment 21, wherein the alkaline earth metal oxide nanoparticle comprises magnesium oxide and the transitional metal oxide nanoparticle comprises zinc oxide, and the weight ratio of the alkaline earth metal oxide relative to the transition metal oxide is about 6:1 to about 1:6.

Embodiment 23. The treatment fluid of any one of Embodiments 18 to 22, wherein the viscoelastic surfactant is present in an amount of about 1 wt. % to about 20 wt. %, based on the total weight of the treatment fluid.

Embodiment 24. The treatment fluid of any one of Embodiments 18 to 23, wherein the treatment fluid has a viscosity of about 50 to about 350 cP at 300° F. and 100 s$^{-1}$.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A method of treating a subterranean formation penetrated by a well, the method comprising:
combining an aqueous base fluid, a viscoelastic surfactant gelling agent, a first nanoparticle comprising magnesium oxide, and a second nanoparticle comprising zinc oxide to form a treatment fluid, and
pumping the treatment fluid into the well,
wherein the weight ratio of the first and the second nanoparticles is selected such that the treatment fluid has an improved fluid efficiency as compared to an otherwise identical reference fluid except for comprising only one of the first and second nanoparticles; and
the weight ratio of the first nanoparticle relative to the second nanoparticle is about 2:1 to about 1:3.

2. The method of claim 1, wherein the aqueous base fluid is a brine comprising about 5 wt. % to about 50 wt. % of a salt.

3. The method of claim 2, wherein the brine is seawater, produced water, completion brine, or a combination thereof.

4. The method of claim 1, wherein the sum of the weight of the first nanoparticle and the second nanoparticle is about 2 parts per weight to about 50 parts by weight per one thousand gallons of the treatment fluid.

5. The method of claim 1, wherein the viscoelastic surfactant is present in an amount of about 2 wt. % to about 20 wt. %, based on the total weight of the treatment fluid.

6. The method of claim 1, wherein the treatment fluid has a viscosity of about 50 to about 350 cP at 300° F. and 100 s$^{-1}$.

7. The method of claim 1, wherein the viscoelastic surfactant gelling agent is erucamidopropyl hydroxypropyl sulfobetaine, erucamidopropyl hydroxyethyl sulfobetaine, erucamidopropyl hydroxymethyl sulfobetaine, or a combination comprising at least one of the foregoing.

8. The method of claim 1, wherein the viscoelastic surfactant gelling agent is erucamidopropyl hydroxypropyl sulfobetaine.

9. The method of claim 1, wherein the viscoelastic surfactant gelling agent is present in an amount of about 5 wt. % to about 15 wt. %, based on the total weight of the treatment fluid.

10. The method of claim 1, wherein the sum of the weight of the first nanoparticle and the second nanoparticle is about 10 parts per weight to about 40 parts by weight per one thousand gallons of the treatment fluid.

11. The method of claim 1, wherein the sum of the weight of the first nanoparticle and the second nanoparticle is about 20 parts per weight to about 30 parts by weight per one thousand gallons of the treatment fluid.

12. The method of claim 1, wherein the treatment fluid has a viscosity of about 50 to about 350 cP at 300° F. and 100 s$^{-1}$.

13. The method of claim 1, wherein the first nanoparticle and the second nanoparticle each independently has a particle size of about 10 nanometers to about 500 nanometers.

14. The method of claim 13, wherein the first nanoparticle and the second nanoparticle each independently has a particle size of about 20 nanometers to about 100 nanometers.

15. The method of claim 13, wherein the first nanoparticle and the second nanoparticle each independently has a particle size of about 20 nanometers to about 40 nanometers.

16. A method of treating a subterranean formation penetrated by a well, the method comprising:
combining an aqueous base fluid, a viscoelastic surfactant gelling agent, a magnesium oxide nanoparticle, and a zinc oxide nanoparticle to form a treatment fluid, and
pumping the treatment fluid into the well,
wherein the weight ratio of the magnesium oxide nanoparticle and the zinc oxide nanoparticle is selected such that the treatment fluid has an improved fluid efficiency as compared to an otherwise identical reference fluid except for comprising only one of magnesium oxide nanoparticle and zinc oxide nanoparticle, the magnesium oxide nanoparticle and the zinc oxide nanoparticle each independently has a particle size of about 20 nanometers to about 40 nanometers, the sum of the weight of the magnesium oxide nanoparticle and the zinc oxide nanoparticle is about 20 parts per weight to about 30 parts by weight per one thousand gallons of the treatment fluid, and the weight ratio of the magnesium oxide nanoparticle relative to the zinc oxide nanoparticle is about 2:1 to about 1:3.

17. The method of claim 16, wherein the viscoelastic surfactant gelling agent is erucamidopropyl hydroxypropyl sulfobetaine, erucamidopropyl hydroxyethyl sulfobetaine, erucamidopropyl hydroxymethyl sulfobetaine, or a combination comprising at least one of the foregoing, and the viscoelastic surfactant gelling agent is present in an amount of about 2 wt. % to about 20 wt. %, based on the total weight of the treatment fluid.

18. The method of claim 16, wherein the aqueous base fluid is a brine comprising about 15 wt. % to about 40 wt. % of a salt.

* * * * *